(12) United States Patent
Macaluso

(10) Patent No.: US 11,472,306 B1
(45) Date of Patent: Oct. 18, 2022

(54) ELECTRIC VEHICLE CHARGING STATION

(71) Applicant: Anthony Macaluso, San Diego, CA (US)

(72) Inventor: Anthony Macaluso, San Diego, CA (US)

( * ) Notice: Subject to any disclaimer, the term of this patent is extended or adjusted under 35 U.S.C. 154(b) by 0 days.

(21) Appl. No.: 17/690,916

(22) Filed: Mar. 9, 2022

(51) Int. Cl.
*H02J 7/00* (2006.01)
*H02J 7/14* (2006.01)
*B60L 53/36* (2019.01)
*B60L 53/66* (2019.01)
*B60L 53/65* (2019.01)
*B60L 53/62* (2019.01)

(52) U.S. Cl.
CPC .............. *B60L 53/36* (2019.02); *B60L 53/62* (2019.02); *B60L 53/65* (2019.02); *B60L 53/66* (2019.02); *H02J 7/00045* (2020.01); *H02J 7/0049* (2020.01)

(58) Field of Classification Search
CPC .......... B60L 53/36; B60L 53/62; B60L 53/66; H02J 7/00045; H02J 7/0049
USPC ................................................. 320/104, 109
See application file for complete search history.

(56) References Cited

U.S. PATENT DOCUMENTS

| | | | |
|---|---|---|---|
| 2,451,965 A | 10/1948 | Longenecker | |
| 2,660,443 A | 11/1953 | Miller | |
| 3,891,044 A | 6/1975 | Tiede | |
| 3,961,678 A | 6/1976 | Hirano et al. | |
| 3,978,936 A | 9/1976 | Schwartz | |
| 4,214,160 A | 7/1980 | Fies et al. | |
| 4,314,160 A | 2/1982 | Boodman et al. | |
| 4,364,448 A | 12/1982 | Ikuma | |
| 4,476,947 A | 10/1984 | Rynbrandt | |
| 4,579,188 A | 4/1986 | Facer | |
| 5,045,646 A | 9/1991 | Musachio | |
| 5,078,227 A | 1/1992 | Becker | |
| 5,086,857 A * | 2/1992 | Dale | H02K 7/1861 180/53.61 |
| 5,316,101 A | 5/1994 | Gannon | |
| 5,412,293 A | 5/1995 | Minezawa et al. | |

(Continued)

FOREIGN PATENT DOCUMENTS

| | | |
|---|---|---|
| CN | 107804326 | 1/2020 |
| EP | 1 253 698 | 10/2002 |

(Continued)

*Primary Examiner* — Alexis B Pacheco
(74) *Attorney, Agent, or Firm* — Knobbe, Martens, Olson & Bear, LLP

(57) ABSTRACT

This disclosure is directed to methods and systems for charging an electric vehicle. A charging system may be used to charge the energy storage devices of an electric vehicle by using the power generation or regeneration systems or devices of the vehicle. The vehicle may access the charging system by positioning one or more wheels of the vehicle adjacent to, or on top of, one or more drive rollers of the charging system. The driver rollers may be rotatably coupled to one or more motors. A controller may control operation of the charging system, including the charging of the vehicle, by causing the motor to cause the drive rollers to rotate. The wheels of the vehicle may rotate in response to rotation of the drive rollers, causing power generation or regeneration systems of the vehicle to generate energy to store in an energy storage device of the vehicle.

20 Claims, 10 Drawing Sheets

(56) References Cited

U.S. PATENT DOCUMENTS

| | | | |
|---|---|---|---|
| 5,491,390 A | 2/1996 | McGreen | |
| 5,671,821 A | 9/1997 | McGreen | |
| 5,680,907 A | 10/1997 | Weihe | |
| 5,735,363 A | 4/1998 | Horovitz et al. | |
| 5,767,663 A | 6/1998 | Lu | |
| 5,921,334 A | 7/1999 | Al-Dokhi | |
| 5,992,553 A | 11/1999 | Morrison | |
| 6,065,557 A | 5/2000 | von Keyserling | |
| 6,220,381 B1 | 4/2001 | Damron et al. | |
| 6,390,215 B1 | 5/2002 | Kodama | |
| 6,502,842 B2 | 1/2003 | Ko | |
| 6,531,838 B2 | 3/2003 | Parks | |
| 6,703,716 B2 | 3/2004 | Chiu | |
| 6,717,280 B1 | 4/2004 | Bienville | |
| 6,987,327 B1 | 1/2006 | Lucatero | |
| 7,183,746 B1 | 2/2007 | Carter | |
| 7,514,803 B2 | 4/2009 | Wilks | |
| 7,547,980 B2 | 6/2009 | Harrison | |
| 7,753,010 B2 | 7/2010 | Rutledge | |
| 7,913,783 B2 | 3/2011 | Elmaleh | |
| 8,063,609 B2 | 11/2011 | Salasoo et al. | |
| 8,206,263 B2 | 6/2012 | Tsuchikawa | |
| 8,347,999 B2 | 1/2013 | Koelsch et al. | |
| 8,573,346 B2 | 11/2013 | Duignan | |
| 8,712,620 B2 | 4/2014 | Jackson | |
| 8,723,344 B1 | 5/2014 | Dierickx | |
| 8,872,368 B1 | 10/2014 | Kim et al. | |
| 8,907,631 B1 | 12/2014 | Gurries | |
| 9,236,761 B2 | 1/2016 | Strothmann | |
| 9,242,698 B2 | 1/2016 | Frieden | |
| 9,321,357 B2 | 4/2016 | Caldeira et al. | |
| 9,415,660 B2 | 8/2016 | Koelsch | |
| 9,457,666 B2 | 10/2016 | Caldeira et al. | |
| 9,981,553 B2 | 5/2018 | Schafer | |
| 10,077,056 B1 | 9/2018 | Fields | |
| 10,293,702 B2 | 5/2019 | Tu et al. | |
| 10,513,180 B2 | 12/2019 | Quill | |
| 10,787,089 B1 | 9/2020 | Macaluso | |
| 10,889,186 B2 | 1/2021 | Schutt | |
| 11,007,878 B2 | 5/2021 | Kamino et al. | |
| 11,072,254 B1 | 7/2021 | Macaluso | |
| 11,117,481 B2 | 9/2021 | Macaluso | |
| 11,130,415 B2 | 9/2021 | Macaluso | |
| 11,133,729 B2 | 9/2021 | Macaluso | |
| 11,222,750 B1 | 1/2022 | Macaluso | |
| 11,289,974 B2 | 3/2022 | Macaluso | |
| 11,299,054 B2 | 4/2022 | Macaluso | |
| 11,318,856 B2 | 5/2022 | Macaluso | |
| 11,322,311 B2 | 5/2022 | Macaluso | |
| 2003/0071464 A1 | 4/2003 | Chiu | |
| 2003/0139859 A1 | 7/2003 | Hanada | |
| 2003/0184258 A1 | 10/2003 | VonderHaar | |
| 2004/0012205 A1 | 1/2004 | Sua-An | |
| 2005/0224263 A1 | 10/2005 | Vasilantone | |
| 2006/0238258 A1 | 10/2006 | D'Amore | |
| 2007/0075677 A1 | 4/2007 | Alvarez-Troncoso | |
| 2007/0090702 A1 | 4/2007 | Schiller | |
| 2007/0187957 A1 | 8/2007 | Harrison | |
| 2008/0066979 A1 | 3/2008 | Carter | |
| 2008/0223637 A1 | 9/2008 | Bartilson | |
| 2008/0289890 A1 | 11/2008 | Stoltzfus | |
| 2008/0297109 A1* | 12/2008 | Sandberg | H02J 7/0013 320/109 |
| 2009/0033254 A1 | 2/2009 | Nagashima et al. | |
| 2009/0079417 A1 | 3/2009 | Mort et al. | |
| 2009/0145674 A1 | 6/2009 | Lee | |
| 2010/0019718 A1 | 1/2010 | Salasoo | |
| 2010/0117600 A1 | 5/2010 | Fazakas | |
| 2010/0327600 A1 | 12/2010 | Koelsch | |
| 2011/0106329 A1* | 5/2011 | Donnelly | H02J 7/0027 320/109 |
| 2011/0163717 A1 | 7/2011 | Gale | |
| 2011/0189507 A1 | 8/2011 | Reis | |
| 2011/0200193 A1 | 8/2011 | Blitz et al. | |
| 2012/0012406 A1 | 1/2012 | Stoicoviciu | |
| 2012/0309455 A1* | 12/2012 | Klose | B60L 53/65 455/557 |
| 2013/0081886 A1 | 4/2013 | Jaberian | |
| 2013/0096759 A1 | 4/2013 | Breton et al. | |
| 2013/0119665 A1 | 5/2013 | Berbari | |
| 2013/0257145 A1 | 10/2013 | Caldeira et al. | |
| 2013/0266826 A1 | 10/2013 | Cowperthwaite | |
| 2013/0332014 A1 | 12/2013 | Jackson | |
| 2014/0091573 A1 | 4/2014 | Berbari | |
| 2014/0132155 A1 | 5/2014 | Strothmann | |
| 2014/0210398 A1 | 7/2014 | Powell | |
| 2014/0244082 A1 | 8/2014 | Caron | |
| 2014/0285209 A1 | 9/2014 | Stichowski et al. | |
| 2014/0368041 A1 | 12/2014 | Tu et al. | |
| 2015/0089981 A1 | 4/2015 | Renfro | |
| 2015/0197780 A1 | 7/2015 | Xu | |
| 2015/0249362 A1 | 9/2015 | Bridgelall et al. | |
| 2015/0260835 A1 | 9/2015 | Widmer et al. | |
| 2015/0343909 A1 | 12/2015 | Hikiri | |
| 2016/0089981 A1 | 3/2016 | Kodawara | |
| 2016/0111907 A1 | 4/2016 | Lynds | |
| 2016/0164373 A1 | 6/2016 | Liao et al. | |
| 2016/0236578 A1 | 8/2016 | Liao | |
| 2016/0243960 A1 | 8/2016 | Wood | |
| 2017/0063124 A1 | 3/2017 | Yu et al. | |
| 2017/0117720 A1 | 4/2017 | Yung | |
| 2017/0176540 A1 | 6/2017 | Omi | |
| 2017/0366017 A1 | 12/2017 | Clay et al. | |
| 2018/0009329 A1 | 1/2018 | Tellez | |
| 2018/0083469 A1 | 3/2018 | Bauer et al. | |
| 2018/0156144 A1 | 6/2018 | Inoue | |
| 2018/0166750 A1 | 6/2018 | Chang | |
| 2018/0215272 A1 | 8/2018 | Vitullo et al. | |
| 2018/0312159 A1 | 11/2018 | Jent, II | |
| 2019/0001804 A1 | 1/2019 | Wilhide | |
| 2019/0004580 A1 | 1/2019 | Wilhide | |
| 2019/0140245 A1 | 5/2019 | Mensch | |
| 2019/0184843 A1* | 6/2019 | Jung | F16H 61/662 |
| 2019/0245375 A1* | 8/2019 | Schmalzrieth | H02K 7/1861 |
| 2019/0329650 A1 | 10/2019 | Quill | |
| 2019/0351895 A1 | 11/2019 | Ben-Ari | |
| 2019/0351899 A1 | 11/2019 | Adam | |
| 2019/0351948 A1 | 11/2019 | Derissaint | |
| 2019/0359080 A1 | 11/2019 | Hellgren | |
| 2020/0039379 A1 | 2/2020 | Schlosser | |
| 2020/0207209 A1 | 7/2020 | Engel | |
| 2020/0381784 A1 | 12/2020 | Yamamoto | |
| 2020/0384873 A1 | 12/2020 | Macaluso | |
| 2021/0001737 A1* | 1/2021 | Hoess | H01R 13/5213 |
| 2021/0046833 A1 | 2/2021 | Macaluso | |
| 2021/0313121 A1 | 10/2021 | Macaluso | |
| 2022/0016941 A1 | 1/2022 | Sams | |
| 2022/0028625 A1 | 1/2022 | Macaluso | |
| 2022/0028627 A1 | 1/2022 | Macaluso | |
| 2022/0052582 A1* | 2/2022 | Giannotta | H02J 15/007 |
| 2022/0068570 A1 | 3/2022 | Macaluso | |
| 2022/0167134 A1 | 5/2022 | Macaluso | |
| 2022/0209624 A1 | 6/2022 | Macaluso | |

FOREIGN PATENT DOCUMENTS

| WO | WO 09/149769 | 12/2009 |
|---|---|---|
| WO | WO 10/133863 | 11/2010 |
| WO | WO 20/191367 | 9/2020 |

* cited by examiner

ELECTRIC VEHICLE CHARGING STATION

FIELD OF THE DISCLOSURE

The present disclosure relates to an electric vehicle charging station or system.

BACKGROUND

Electric vehicles derive locomotion power from electricity often received from an energy storage device within the electric vehicle. Electric vehicles are often proposed to have an energy storage/containment device, such as a battery, that is charged through some type of wired or wireless connection at one or more stationary locations, for example household or commercial supply sources. The wired charging connections require cables or other similar connectors to physically and electrically connect the energy storage device of the vehicle to a stationary power supply. The wireless charging connections require antenna(s) or other similar structures to wirelessly connect to the energy storage device of the vehicle a power supply that generates a wireless field via its own antenna(s). However, such wired and wireless stationary charging systems may be inconvenient, cumbersome, may pose safety risks and may have other drawbacks, such as degradation during energy transference, inefficiencies or losses, and so forth.

SUMMARY

Various embodiments of systems, methods and devices within the scope of the appended claims each have several aspects, no single one of which is solely responsible for the desirable attributes described herein. Without limiting the scope of the appended claims, the description below describes some prominent features.

Details of one or more embodiments of the subject matter described in this specification are set forth in the accompanying drawings and the description below. Other features, aspects, and advantages will become apparent from the description, the drawings, and the claims. Note that relative dimensions of the following figures may not be drawn to scale.

The present disclosure provides a system for charging a stationary electric vehicle using power generation or regeneration devices of the vehicle. The system may comprise: one or more drive rollers rotatably coupled to one or more wheels of the vehicle and configured to rotate and thereby cause the wheels of the vehicle to rotate; one or more motors rotatably coupled to the drive rollers and configured to cause the drive rollers to rotate; a plurality of spindle rollers rotatably coupled to the wheels of the vehicle; a controller, comprising a processor. The controller may be configured to: communicate with the motors to transmit data to the motors and receive data from the motors; generate instructions for a charging sequence of the charging system. The instructions may comprise a determined angular velocity at which to rotate the drive rollers; and transmit the instructions to the motors of the charging system to cause the motors to rotate the drive rollers at the determined angular velocity; and a power source electrically coupled to the motors and controller and configured to provide power to the motors and controller.

In some embodiments, the power source may not be directly electrically coupled to the vehicle.

In some embodiments, the drive rollers may be configured to be located at a substantially ground surface height.

In some embodiments, the system may further comprise a ramp configured to rest on a ground surface, and the drive rollers may be configured at a top portion of the ramp.

In some embodiments, the controller may comprise a handheld device comprising an interactive user interface.

In some embodiments, the controller may be configured to: receive a user input; and generate the instructions for the charging sequence based, at least in part, on the user input.

In some embodiments, the controller may be configured to: receive operational settings relating to a charging sequence, and the operational settings may be received from a memory of the controller, an external data store, or the vehicle; and generate the instructions for the charging sequence based, at least in part, on the operational settings.

In some embodiments, the controller may be configured to communicate with the motors wirelessly.

In some embodiments, the controller may be included in the vehicle.

In some embodiments, the controller may be configured to communicate with the vehicle to transmit data to the vehicle and receive data from the vehicle.

In some embodiments, the controller may be configured to: receive data from the vehicle relating to charging requirements of the vehicle; and generate the instructions for the charging sequence based, at least in part, on the data from the vehicle relating to the charging requirements.

In some embodiments, the controller may be configured to receive data from the vehicle relating to an identity of the vehicle or permissions of the vehicle to access the charging system to be charged.

In some embodiments, the controller may be configured to: determine, based on the identity of the vehicle or the permissions of the vehicle, whether the vehicle has permission to access the charging system to be charged; and in response to determining that the vehicle has permission to access the charging system, generate the instructions for the charging sequence of the charging system.

In some embodiments, the system may further comprise a stop plate configured to: communicate with the controller to transmit data to the controller and receive data from the controller; and transition between an upward position and a downward position in response to instructions received from the controller. In the upward position, the stop plate may be configured to prevent the vehicle from accessing the charging system to be charged, and in the downward position the stop plate may be configured to allow the vehicle to access the charging system to be charged.

In some embodiments, the controller may be configured to verify permissions of the vehicle prior to transmitting instructions to the stop plate to transition to the downward position.

The present disclosure provides a method for charging a stationary electric vehicle using power generation or regeneration devices of the vehicle. The method may comprise: under control of a processor of a controller of a charging system: generating instructions for a charging sequence, and the instructions may comprise a determined angular velocity at which to rotate one or more drive rollers of the charging system; and transmitting the instructions, from the controller, to a motor of the charging system; in response to receiving the instructions at the motor, causing the motor to rotate the drive rollers at the determined angular velocity; and by the rotation of the drive rollers at the determined angular velocity, causing one or more wheels of the vehicle to rotate, and rotation of said wheels of the vehicle may cause power generation or regeneration devices of the vehicle to generate an electric charge to store in an energy storage device of the vehicle.

In some implementations, 10 the method may further comprise: receiving, at the controller, data from the vehicle relating to charging requirements of the vehicle; receiving, at the controller, user input; and generating the instructions for the charging sequence based at least in part on the user input or the data from the vehicle.

In some implementations, the method may further comprise: verifying, by the controller, permissions of the vehicle to access the charging system to be charged; determining, according to the permissions whether the vehicle has permission to access the charging system to be charged; in response to determining that the vehicle has permission to access the charging system to be charged: generating, at the controller, instructions to place a stop plate of the charging system in a downward position; transmitting, from the controller, said instructions to the stop plate to place the stop plate in the downward position to allow the vehicle to access the charging system; and generating, at the controller, the instructions for the charging sequence; and in response to determining that the vehicle does not have permission to access the charging system to be charged: generating, at the controller, instructions to place the stop plate of the charging system in an upward position; transmitting, from the controller, said instructions to the stop plate to place the stop plate in the upward position to prevent the vehicle from accessing the charging system; and not generating, at the controller, the instructions for the charging sequence.

The present disclosure provides a method for charging a stationary electric vehicle using power generation or regeneration devices of the vehicle. The method may comprise: under control of a processor of a controller of a charging system: establishing communication between the controller and the vehicle; receiving data from the vehicle comprising charging requirements of the vehicle or operational settings relating to charging the vehicle; receiving user input relating to charging the vehicle; determining, based at least in part on the user input or the data from the vehicle, an angular velocity at which to rotate one or more drive rollers of the charging system; generating instructions for causing a motor to rotate the drive rollers at the determined angular velocity; transmitting the instructions to the motor to cause the motor to rotate the drive rollers at the determined angular velocity, and rotation of the one or more drive rollers may cause one or more wheels of the vehicle to rotate, and rotation of the one or more wheels of the vehicle may cause the vehicle to generate and store an electric charge; receiving, at the controller and from the vehicle, data relating to a charge status of the vehicle; determining, based at least in part on the data relating to the charge status whether the vehicle is fully charged; in response to determining that the vehicle is fully charged, generating instructions to cause the motor to stop rotating the drive rollers; transmitting the instructions to the motor to cause the motor to stop rotating the drive rollers.

In some implementations, the method may further comprise: determining, an identity of the vehicle and permissions associated with the vehicle; determining, according to the identity and permissions whether the vehicle has permission to access the charging system to be charged; in response to determining that the vehicle has permission to access the charging system to be charged: generating the instructions for causing the motor to rotate the drive rollers at the determined angular velocity; and transmitting the instructions to the motor to cause the motor to rotate the drive rollers at the determined angular velocity; and in response to determining that the vehicle does not have permission to access the charging system to be charged: not generating the instructions for causing the motor to rotate the drive rollers at the determined angular velocity; and not transmitting the instructions to the motor to cause the motor to rotate the drive rollers at the determined angular velocity.

DETAILED DESCRIPTION

Overview

Example embodiments and implementations of an electric vehicle charging station or system are described herein. The charging system may be used to charge any type of vehicle, such as commercial vehicles, trucks, semi-trucks, buses, vans, cars, trains, motorcycles, scooters, bicycles and the like. The charging system can utilize the power generation or regeneration systems of the vehicle to produce a charge or voltage to be stored in an energy storage device of the vehicle. For example, the charging system can cause one or more wheels of a vehicle to rotate. Rotation of the wheels may cause the energy storage systems of the vehicle to generate a charge which may be stored in the vehicle's energy storage devices. The charging system may be capable of completely charging a vehicle (e.g., an energy storage device of a vehicle) in a relatively short time frame, such as about less than twenty minutes, less than ten minutes, or less than five minutes.

Advantageously, in some embodiments, the electric vehicle charging station or system described herein may not require a direct electrical connection to be established between the vehicle or the vehicles components and a power source (e.g., via a plug) in order to charge the vehicle (e.g., an energy storage device of the vehicle).

Example Systems and Embodiments for an Electric Vehicle Charger

Figure 1A:
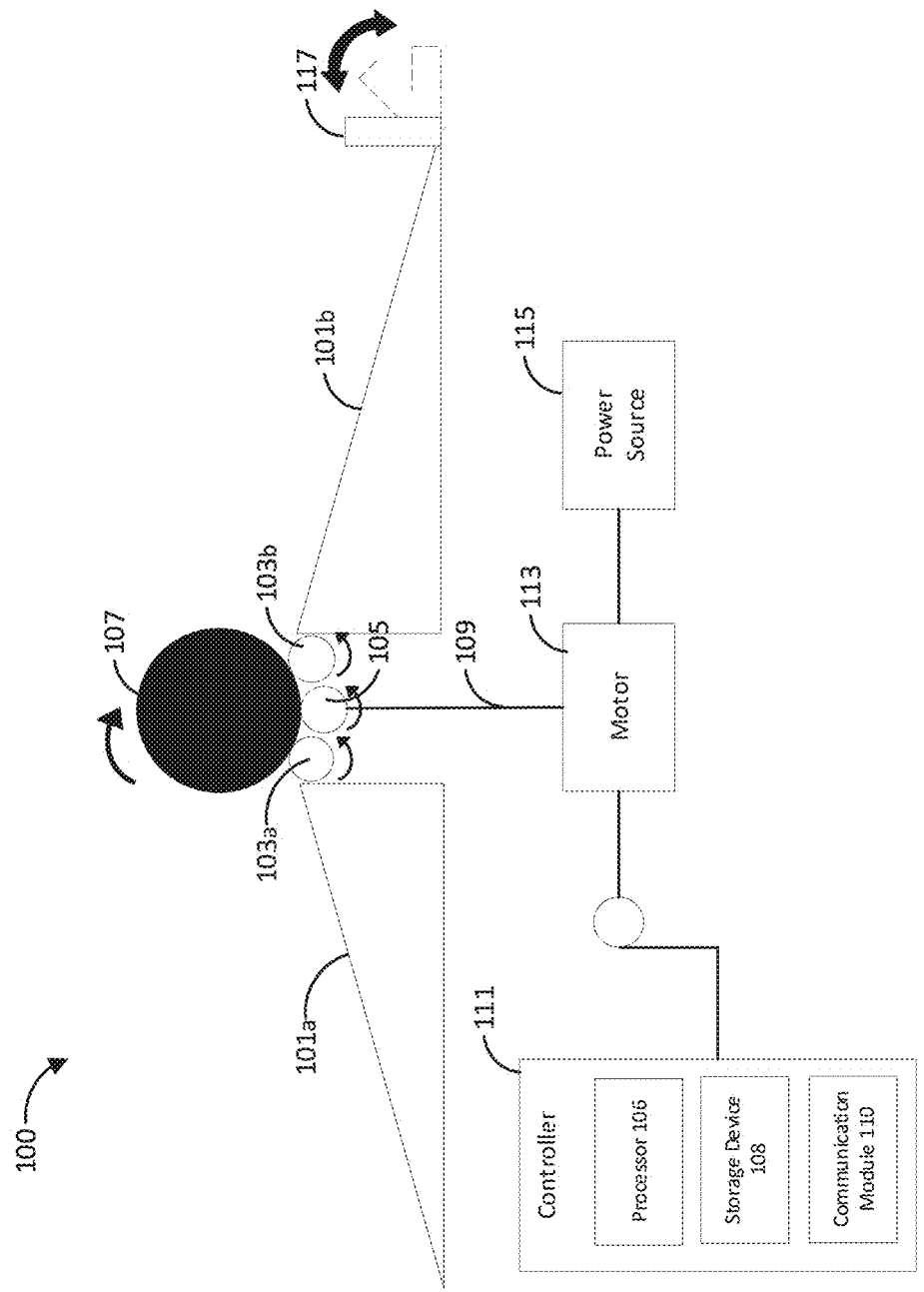
FIGS. 1A-1B are schematic diagrams illustrating side-views of example embodiments of an electric vehicle charging system.

FIG. 1A is a schematic diagram illustrating a side-view of an example embodiment of an electric vehicle charging station or system 100 (e.g., charging system 100). The electric vehicle charging system 100 may be configured to charge an electric vehicle or its various components such as an energy storage device (e.g., a battery, capacitor etc.). The electric vehicle charging system 100 can charge the electric vehicle by utilizing the vehicle's energy generation or regeneration capabilities. For example, the electric vehicle charging system 100 can rotate one or more wheels of the vehicle to cause the vehicle power generation or regeneration systems to create a charge to store in (e.g., charge the voltage of) the energy storage devices (e.g., battery, capacitor) of the vehicle. The vehicle may be stationary while the vehicle wheel(s) are rotating and the vehicle charging is occurring. The vehicle may be in a drive gear while the vehicle wheel(s) are rotating and the vehicle charging is occurring. The vehicle may not be providing power to the vehicle motor or may be providing power to the motor while the vehicle wheel(s) are rotating and the vehicle charging is occurring.

The electric vehicle charging system 100 may include one or more ramps 101a, 101b, one or more spindle rollers 103a, 103b, one or more drive rollers 105, a stop plate 117, a controller 111, one or more motors 113 and a power source 115. The roller(s) 105 may be rotatably coupled to a vehicle wheel 107 and may cause the vehicle wheel 107 to rotate to generate energy to charge an energy storage device of the vehicle. FIG. 1A is provided as an example embodiment of the electric vehicle charging system described herein and is not meant to be limiting. In some embodiments the charging system may include more or less components than what is shown in FIG. 1A and/or may include components in a different configuration than what is shown in FIG. 1A.

The electric vehicle charging system 100 may include one or more ramps 101a, 101b. Ramp 101a may be an on-ramp. Ramp 101b may be an off-ramp. On-ramp 101a may be configured to facilitate a vehicle driving onto the electric vehicle charging system 100 such that the vehicle wheel(s) 107 are in contact with the roller(s) 103, 105. For example, a vehicle may drive up the on-ramp 101a into position to be charged such that one or more wheels 107 of the vehicle are rotatably coupled with the rollers 103, 105. Off-ramp 101b may be configured to facilitate a vehicle driving off of the electric vehicle charging system 100 after no more charging is desired, for example, after the vehicle has been fully charged.

The wheel 107 may be any wheel or other similar rotation device of the vehicle. In some embodiments, the wheel 107 may be a wheel used to drive the vehicle. In some embodiments, the wheel 107 may be a wheel that is not used to drive the vehicle but is devoted solely to power generation or regeneration. In some embodiments, the wheel 107 may have been added to the vehicle after initial manufacturing of the vehicle such as an add-on component. In some embodiments, the charging system 100 may be configured to receive and rotate multiple wheels of a vehicle at the same time.

The charging system 100 may be configured to receive and rotate any size of wheel of any vehicle type. For example, the charging system 100 may receive and rotate the wheels of a semi-truck or the wheels of a farm or lawn equipment such as a tractor or lawn mower or may receive and rotate the wheels of a bicycle or scooter or motorcycle or any other vehicle as required or desired.

The electric vehicle charging system 100 may include one or more spindle rollers 103a, 103b and one or more drive rollers 105. In some embodiments, the charging system 100 may include any number of spindle rollers 103a, 103b as required or desired such as three, four, five, six or more than six spindle rollers 103, 103b. In some embodiments, the charging system 100 may include two spindle rollers 103a, 103b, as shown in FIG. 1A. In some embodiments, the charging system 100 may include any number of drive rollers 105 as required or desired such as two, three, four, five, six or more than six drive rollers 105. In some embodiments, the charging system 100 may include one drive roller 105, as shown in FIG. 1A. The roller(s) 103, 105 may be sized as required or desired to optimize vehicle wheel 107 rotation and vehicle charging. In some embodiments, the rollers 103, 105 may be of a smaller diameter than the wheel 107. In some embodiments, the rollers 103, 105 may be of a larger diameter than the wheel 107. The roller(s) 103, 105 may be sized independently of one another.

The roller(s) 103, 105 may be configured to rotate at one or more angular velocities as required or desired. For example, the angular velocity of the drive roller 105 may be set or adjusted automatically or manually. Increasing the angular velocity of the drive roller 105 may increase an angular velocity of the wheel 107 which may in turn shorten the time required to charge the vehicle.

The roller(s) 103, 105 may be configured in an arrangement to hold a vehicle wheel 107 such that a vehicle may rest in a stationary position while being charged by the charging system 100. For example, the roller(s) 103, 105 may be configured to prevent the vehicle from rolling away from the charging system 100 via the ramps 101a, 101b while the wheel 107 is rotating and the vehicle is being charged. In some embodiments, the roller(s) 103, 105 may be positioned such that a roller positioned at a centermost location between the ramps 101a, 101b (which may be drive roller 105) may be lower than the adjacent rollers on either side (which may be rollers 103a, 103b), as shown in FIG. 1A, to facilitate holding the vehicle in a stationary location while the wheel 107 is rotating and charging is occurring.

The drive roller(s) 105 may be electrically and/or mechanically coupled to a motor 113. For example, drive roller 105 may be rotatably coupled to the motor 113 via a rotational coupling 109. The rotational coupling 109 may comprise one or more of a shaft, gear, pulley, belt, chain or other similar components or devices configured to transfer a mechanical force such as a rotational force from the motor to the drive roller 105. The motor 113 may generate a rotational force which may be applied to the drive roller 105 via the rotational coupling 109. The motor 113 may cause the drive roller 105 to rotate. Rotation of the drive roller 105 may cause the wheel 107 to rotate. Rotation of the wheel 107 may cause the energy generation or regeneration systems of the vehicle to create a charge to charge a voltage of the energy storage device(s) of the vehicle.

In some embodiments, the spindle roller(s) 103a, 103b may be configured to rotate freely. For example, the spindle roller(s) 103a, 103b may not be directly rotatably coupled to the motor 113. The spindle roller(s) 103a, 103b may rotate in response to a rotation of the driver roller 105 and/or a rotation of the wheel 107.

The motor 113 may be configured to cause the drive roller(s) 105 rotate at one or more angular velocities. For example, the motor 113 may be configured to operate at one or more operational settings such that the motor 113 causes the drive roller(s) 105 to rotate at one or more angular velocities. Changing the angular velocity at which the drive roller(s) 105 rotate may increase or decrease the time required to charge the vehicle. The motor 113 may be configured to cause the drive roller 105 to rotate at any angular velocity as required or desired. The angular velocity may vary depending on the size of the drive roller 105, the size of the wheel 107, the charge required by the vehicle and/or the time desired to charge the vehicle. In some embodiments, the motor 113 may cause the drive roller 105 to rotate at or between 1000 and 2000 RPMs or 2000 and 3000 RPMs or 3000 and 4000 RPMS or 4000 and 5000 RPMS or 5000 and 6000 RPMS or 6000 and 7000 RPMS or 7000 and 8000 RPMS or 8000 and 9000 RPMS or 9000 and 10000 RPMS.

The motor 113 may be electrically coupled to a power source 115. The power source 115 may provide energy to the charging system and its various components. For example, the power source 115 may power the motor 113 and/or controller 111. The power source may be any power source capable of holding and/or conveying an electric voltage or charge. For example, the power source 115 may comprise Mains electricity or the power grid to which the motor may be coupled via a standard 110V or 220V outlet. The power source 115 may comprise a portable power source such as a battery or capacitor capable of holding or storing a charge such as a voltage differential. The power source 115 may comprise a generator capable of generating or converting energy, such as a combustion generator, a solar generator, a wind generator or a hydro generator.

The electric vehicle charging system 100 may include a controller 111. The controller 111 may be electrically coupled to the motor 113 and/or the power source 115. In some embodiments, the power source 115 may power the controller 111. In some embodiments, the controller 111 may comprise an energy storage device such as one or more batteries to power the operation of the controller 111.

As shown, the controller 111 may include a communication module 110, one or more processors 106, and a storage device 108. The processor 106 can be configured, among other things, to process data, execute instructions to perform one or more functions, and/or control the operation of the controller 111, the charging system 100, and/or a vehicle. For example, the processor 106 can process data obtained from other components of the charging system (e.g., motor 113, stop plate 117) as well as data obtained from a vehicle (e.g., from a management system of a vehicle) and can execute instructions to perform functions related to analyzing, storing, and/or transmitting such data.

The storage device 108 can include one or more memory devices that store data, including without limitation, dynamic and/or static random access memory (RAM), programmable read-only memory (PROM), erasable programmable read-only memory (EPROM), electrically erasable programmable read-only memory (EEPROM), and the like. The storage device 108 can be configured to store data such as data obtained from other components of the charging system, from a vehicle, and the like. The processor 106 can be configured to access the storage device 108 to retrieve the data stored therein.

The communication module 110 can facilitate communication (via wired and/or wireless connection) between the controller 111 (and/or components thereof) and separate devices, such as other components of the charging system 100 (e.g., motor 113, stop plate 117) or a vehicle. For example, the communication module 110 can be configured to allow the controller 111 to wirelessly communicate with other devices, systems, sensors, and/or networks over any of a variety of communication protocols. The communication module 110 can be configured to use any of a variety of wireless communication protocols, such as Wi-Fi (802.11x), Bluetooth®, ZigBee®, Z-wave®, cellular telephony, infrared, near-field communications (NFC), RFID, satellite transmission, proprietary protocols, combinations of the same, and the like. The communication module 110 can allow data and/or instructions to be transmitted and/or received to and/or from the controller 111 and separate devices. The communication module 110 can be configured to receive (for example, wirelessly) data and/or other information. The communication module 252 can be configured to transmit (for example, wirelessly) data and/or other information such as instructions. For example, the communication module 252 can be configured to receive and/or transmit data to other components of the charging system 100 or to a vehicle, or to a management system of a vehicle, to a remote data store, or to the cloud, or to other devices which can include, among others, a mobile device (for example, an iOS or Android enabled smartphone, tablet, laptop), a desktop computer, a server or other computing or processing device for display.

The communication module 110 can be embodied in one or more components that are in communication with each other. The communication module 110 can comprise a wireless transceiver, an antenna, and/or a near field communication (NFC) component, for example, an NFC transponder.

The controller 111 may be in communication (e.g., via the communication module 110) with other components of the charging system 100 such as the motor 113 or the stop plate 117. The controller may be configured to transmit data to, and/or receive data from, the other components of the charging system 100 (e.g., motor 113, stop plate 117). In some embodiments, the controller 111 may communicate (e.g., transfer or receive data) with the other components of the charging system 100 via a wired connection. In some embodiments, the controller 111 may communicate (e.g., transfer or receive data) with the other components of the charging system 100 wirelessly, for example, via a network, bluetooth technology or the like. In some embodiments, the controller 111 may be configured to transmit data to, and/or receive data from (e.g., is in communication with) the vehicle that is being charged or the components of said vehicle. For example, the controller 111 may be in communication with a battery management system (BMS) of the vehicle. The battery management system may communicate data to the controller relating the energy storage devices of the vehicle or power generation or regeneration systems of the vehicle, such as a charge level of the energy storage devices, a rate of charge, a time remaining until fully charged and the like. The controller 111 may communicate with the vehicle or components thereof, wirelessly or via a wired connection as described above.

The controller 111 may be configured to communicate data to the motor 113 to control the operation of the motor 113. For example, the controller 111 may communicate data to the motor 113 to set or adjust an angular velocity at which the motor 113 causes the drive roller 105 to rotate. In some embodiments, the controller 111 may set the angular velocity automatically. For example, the controller 111 may cause the motor 113 to operate according to preconfigured settings such as may be stored in memory on the controller 111. In some embodiments, the controller 111 may store settings corresponding to one or more vehicle types which settings may cause the charging system 100 to operate differently as required by the various vehicle (or energy storage device) types. As another example, the controller 111 may cause the motor 113 to operate in response to data received at the controller from the motor 113 and/or the vehicle (or vehicle components such as a BMS). For example, the controller 111 may receive data from the vehicle (for example communicated wirelessly) that the energy storage device is at a certain charge level along with other charging or voltage requirements of the energy storage device. The controller 111 may, accordingly, communicate instructions to the motor 113 to cause the motor 113 to drive the drive roller 105 at a certain angular velocity. As another example, the controller 111 may receive data from the vehicle that the energy storage device of the vehicle is fully charged. In response, the controller 111 may cause the motor 113 to stop driving the drive roller 105 to end the charge sequence of the vehicle.

In some embodiments, the controller 111 may operate in response to a user input. For example, the controller 111 may cause the motor 113 to operate (e.g., drive at certain angular velocities) in response to a manual user input. A user may control operation of the charging system 100 or its various devices and components via the controller 111. A user may manually select, via the controller, the angular velocity at which the motor 113 drives the drive roller 105.

The controller 111 may comprise an interactive user interface such as a display which may display information (e.g., to a user) relating to the operation of the charging system 100 and/or the charging sequence of the vehicle. The interactive user interface (e.g., display) may also receive user input to control operation of the controller and/or the charging system 100. The display may be an LCD display, a capacitive touchscreen or the like. The controller 100 and/or interactive user interface thereof may comprise input controls such as buttons, sliders, dials, knobs and the like which may be actuated via mechanical input and/or via electrical input such as via a capacitive touchscreen.

In some embodiments, the controller 111 may comprise a handheld device. In some embodiments, the controller 111 may comprise a phone, tablet, handheld electronic, personal computer or other similar computing device configured with an executable application to control operation of the charging system as described herein. In some embodiments, the controller 111 may be portable. In some embodiments, the controller 111 may be remote to the charging system 100 and its various other components.

In some embodiments, the controller 111 may comprise a fixed device, for example a device that is fixed with respect to the charging system 100 or the other components thereof. For example, the controller 111 may comprise a single integrate unit with the charging system 100 or other components thereof. For example, the controller 111 may be integrated into a single unit with the motor 113 or into a single unit with one of the ramps 101. In some embodiments, the controller 111 may be in communication with one or more devices remote to the charging system 100 such as phone or computer.

In some embodiments, the controller 111 may be comprised as part of the vehicle that is being charged. As the vehicle enters the charging system 100 to be charged the controller 111 (from within the vehicle) may establish a wireless connection with the other components of the charging system 100 and may control operation of the charging system 100 and its components. The controller 111 may automatically control operation of the charging system 100 or may control operation of the charging system 100 in response to user input at the controller 111. As an example, the controller 111 may be comprised as part of a dashboard area of the vehicle. A user (e.g., an operator of the vehicle) may control the charging of their vehicle via the controller 111 by operating the controller 111 on the dashboard of the vehicle.

The electric vehicle charging system 100 may include a stop plate 117. The stop plate 117 may be positioned at various locations along the ramp 101, for example at a bottom portion of the ramp 101 or a top portion of the ramp 101. The stop plate 117 can help to keep a vehicle stationary by preventing a vehicle from moving (e.g., rolling). For example, when a vehicle wheel 107 is atop the charging system 100 such that a wheel 107 is being rotated by the roller(s) 103, 105, another wheel of the vehicle may be adjacent to the stop plate 117 such that the vehicle is blocked from moving. In some embodiments, one or more front wheels of the vehicle are adjacent to the stop plate 117 while one or more back wheels are being rotated by the roller(s) 103, 105. In some embodiments, one or more back wheels of the vehicle are adjacent to the stop plate 117 while one or more front wheels are being rotated by the roller(s) 103, 105. In some embodiments, one or more back or front wheels of the vehicle are adjacent to the stop plate 117 while another wheel (such as a fifth wheel) of the vehicle is being rotated by the roller(s) 103, 105.

The stop plate 117 may prevent a vehicle from driving up the ramp 101 to be charged by the charging system 100. For example, in some embodiments, it may be desirable to select which vehicles are allowed to use the charging system and which vehicles are not allowed to use the charging system. The stop plate 117 may prevent certain vehicles from accessing the charging system 100 to be charged.

The stop plate 117 may transition, for example as shown in FIG. 1A, from a downward position to an upward position or from an upward position to a downward position. The stop plate 117 may transition between downward and upward positions by rotating or by translating up and down or by some other motion. When the stop plate 117 is in the upward position, the stop plate 117 may prevent a vehicle that is being charged by the charging system 100 from rolling and/or moving. When the stop plate 117 is in the upward position, the stop plate 117 may prevent vehicles from entering the charging system 100 to charge. Such vehicles prevented from entering the charging system 100 may be specifically selected (e.g., intentionally filtered) to be kept from accessing the charging system. When the stop plate 117 is in the downward position, the stop plate 117 may allow a vehicle to leave the charging system 100, such as a vehicle that has finished charging. When the stop plate 117 is in the downward position, the stop plate 117 may allow a vehicle to enter the charging system 100. Such vehicles that are allowed to access the charging system 100 may be specifically selected to be allowed to access the charging system 100 to be charged.

The stop plate 117 may transition between the upward and downward positions automatically or manually. For example, the stop plate 117 may transition in response to a command from the controller 111. The controller 111 may communicate data (e.g., instructions) to the stop plate 117 to control operation of the stop plate 117. The controller 111 may communicate data to the stop plate 117 in response to user input at the controller 111 or automatically, for example in response to data received at the controller 111 and/or according to one or more operational settings included in the controller 111.

In some embodiments, the stop plate 117 may transition in response to a signal from a sensor which may be included in the charging system 100, such as a sensor configured to detect the location or presence of a vehicle on the charging system 100 such as a motion sensor (such as an IR sensor), a weight sensor, a magnetic field detector sensor or the like.

The stop plate 117 may include one or more actuators such as pistons, levers or the like for controlling the transition of the stop plate 117 between the downward and upward positions. Electronics, for example included in the stop plate 117 or the controller 111, can control the actuators to control when the stop plate 117 transitions between the downward and upward positions.

In some embodiments, the stop plate 117 may be manually transitioned between the downward and upward positions. For example, a user may lift the stop plate 117 from a downward position to an upward position or may lower the stop plate 117 from an upward position to a downward position.

In some embodiments, the stop plate 117 may include various levels or increments between the downward and upward positions, such as one or more halfway positions to the which the stop plate 117 may be positioned for various purposes. In some embodiments, the charging system 100 may include more than one stop plate 117 such as a stop plate on both sides of the charging system 100 on each of the ramps 101.

In some embodiments, the charging system 100, or portions thereof, may be positioned above a ground surface. For example, the ramp(s) 101 may rest on a ground surface such that the roller(s) 103, 105 are positioned at a height above the ground. In some embodiments, the charging system 100 may not include one or more of the ramps 101 such that the roller(s) 103, 105 are positioned at a ground surface or substantially at a ground surface. In some embodiments, the ramps 101 may be inverted from what is shown in FIG. 1A such that the roller(s) 103, 105 are positioned below a ground surface.

In some embodiments, the charging system 100 can be portable. In some embodiments, the charging system 100 can be integrated as a single unit or package. For example, the components of the charging system may comprise a single device. For example, the motor, controller and/or power source may be comprised as part of a ramp 101 of the charging system 100.

In some embodiments, the charging system may allow more than one vehicle to access the charging system at the same time, for example to be charged at the same time.

Figure 1B:
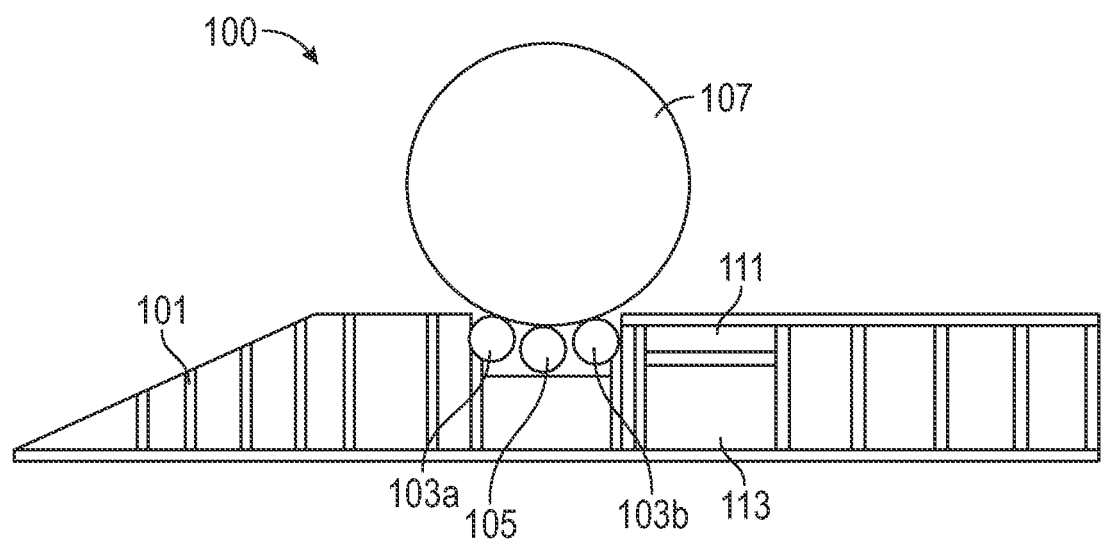

FIG. 1B is a schematic diagram illustrating a side-view of an example embodiment of an electric vehicle charging system 100 (e.g., charging system 100). The embodiment shown in FIG. 1B may include similar components and structural and functional features as described with reference to FIG. 1A. As shown in FIG. 1B, the charging system 100 may be integrated as a single unit. For example, one or more motor(s) 113 may be housed within or adjacent to a ramp portion, stand portion or other similar portion of the charging system 100. Similarly, a controller 111 may be housed within a ramp portion, stand portion or other similar portion of the charging system 100. In some embodiments, the motor(s) 113 may be adjacent to an axis of rotation of the rollers 103, 105. For example, the motor(s) 113 may drive the rollers 103, 105 via a pulley and gear system rather than via a direct connection from a shaft of the motor 113 to a shaft of the drive roller 105.

Figure 1C:
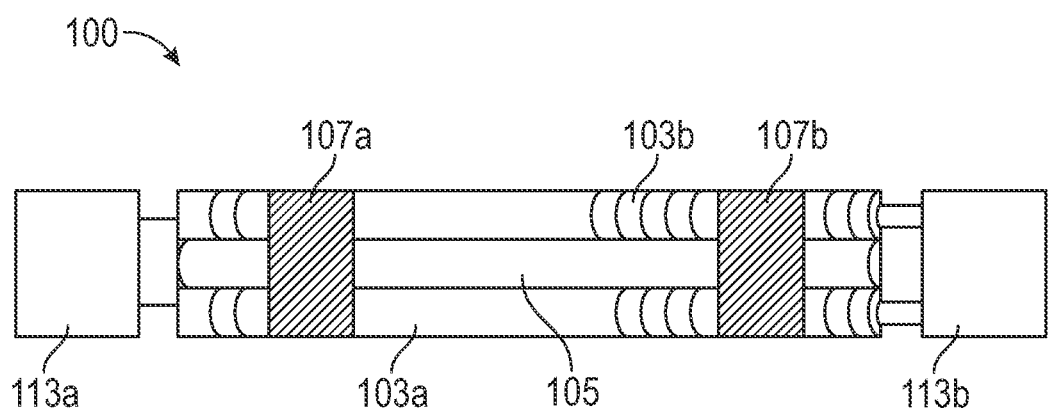
FIG. 1C is a schematic diagram illustrating a top view of an example embodiment of an electric vehicle charging system.

FIG. 1C is a schematic diagram illustrating an aerial view of an example embodiment of an electric vehicle charging system 100 (e.g., charging system 100). The embodiment shown in FIG. 1C may include similar components and structural and functional features as described with reference to the other Figures, such as FIG. 1A. As shown in FIG. 1C, the charging system 100 may include two motors 113a, 113b which may be positioned on either side of the charging system 100. The motors 113a, 113b may be rotatably coupled to a drive roller 105. The motors 113a, 113b may cause the drive roller 105 to rotate, for example at a certain RPM, which can be dynamically controlled and changed by a controller. The drive roller 105 may be rotatably coupled to one or more wheels 107a, 107b of a vehicle. Rotation of the drive roller 105 may cause the wheels 107a, 107b to rotate which may in turn cause the power generation or regeneration systems of the vehicle to store energy in an energy storage device of the vehicle.

The charging system 100 may include one or more spindle rollers 103a, 103b which may be configured to rotate freely (e.g., independently from the drive roller 105 or motors 113a, 113b). For example, the spindle rollers 103a, 103b may not be rotatably coupled to the motors 113a, 113b or the drive roller 105. The spindle rollers 103a, 103b may rotate in response to a rotation of the wheels 107a, 107b and may help to support a weight of the wheels 107a, 107b and the vehicle.

In some embodiments, motor 113a may drive a first drive roller and motor 113b may drive a second drive roller and motors 113a, 113b may operate independently from one another. In some embodiments, motor 113a and motor 113b may operate in unison or in a coordinate manner. In some embodiments, motors 113a, 113b may drive the same drive roller.

As shown in FIG. 1C, the charging system 100 can rotate more than one wheel of a vehicle at a time which may facilitate charging of the vehicle's energy storage devices. FIG. 1C shows two wheels of a vehicle being rotated by the charging system that are side-by-side (such as two font wheels or two back wheels). In some embodiments, multiple wheels of a vehicle may be rotated that are not side-by-side (such as a front wheel and a back wheel). In some embodiments, the charging system 100 can be configured to rotate any of the wheels of a vehicle as required or desired, such as the wheels of an 18-wheel vehicle such as a semi-truck, or the wheels of a motorcycle, or the wheels of a vehicle that do not drive the vehicle but that are devoted solely to power generation or regeneration.

Figure 1D:
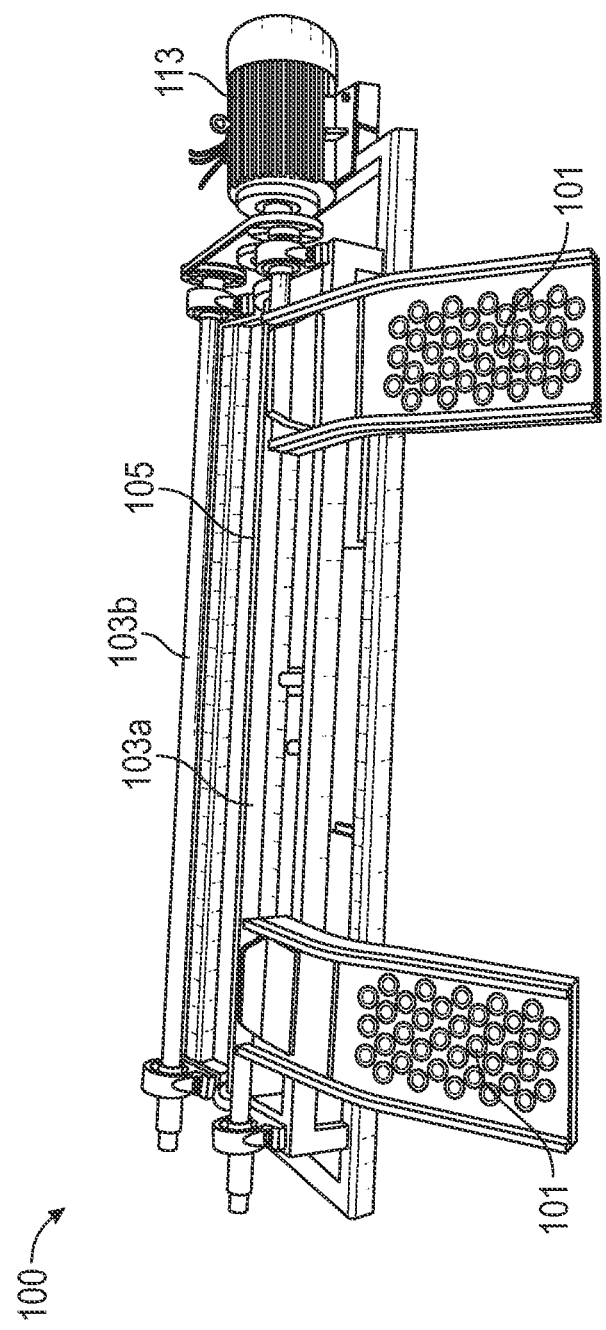
FIGS. 1D-1F illustrate example embodiments of an electric vehicle charging system.

FIG. 1D illustrates an example embodiment of an electric vehicle charging system 100 (e.g., charging system 100). The example embodiment shown in FIG. 1D may include similar components and structural and functional features as described with reference to the other Figures, such as FIG. 1A. As shown in the example embodiment of FIG. 1D, the charging system 100 may include a ramp 101. The ramp 101 may allow a vehicle to access the charging system 100 by allowing the vehicle to drive up the ramp 101 to position the wheels of the vehicle on the rollers 103, 105. The ramp 101 may allow a vehicle to exit the charging system 100 by allowing the vehicle to drive down the ramp 101. The same ramp 101 may be used for entering (e.g., accessing) the charging system 100 and for exiting the charging system 100. In some embodiments, for example as shown in FIG. 1A, one ramp may be used to access the charging system 100 and another different ramp may be used to exit the charging system 100.

As shown in FIG. 1D, the ramp 101 may include two separate portions, which may each correspond to different wheels of a vehicle. The separate portions may be placed according as desired, for example at varying distances from each other, to accommodate various vehicles sizes accessing the charging system 100. For example, various vehicles may have wheels that are wider or narrower in distance from each other which may require the two portions of the ramp 101 shown in FIG. 1D to be spaced at various distances from each other. In some embodiments, the ramp 101 may comprise a single unit, for example a single portion that may be much wider than those portions of the ramp 101 shown in FIG. 1D. A ramp with a single portion that is very wide may provide a "one-size-fits-all" implementation to allow vehicles with various wheel widths to access the charging system 100 without needing to alter the ramp 101 configuration.

In some embodiments, the ramp 101 may be configured with a steeper or shallower incline than shown in the example embodiment of FIG. 1D. In some embodiments, the ramp 101 may be configured to change incline to accommodate various vehicle needs.

As shown in FIG. 1D, the charging system 100 may be configured to be wide enough to allow two wheels of a vehicle to access the charging system 100 to be rotated simultaneously. In some embodiments, the charging system 100 may be wider or narrower than what is shown in the example embodiment of FIG. 1D. For example, the charging system 100 may be wide enough to allow two parallel wheels of a semi-truck, or other large vehicle to be rotated simultaneously. In some embodiments, the charging system 100 may be just wide enough to allow two parallel wheels of a small car or other small vehicle to be rotated simultaneously. In some embodiments, the charging system 100 may be just wide enough to allow only a single wheel to be rotated such as a single wheel of a car or truck or van or other multi-wheel vehicle, or a single wheel of a motorcycle or bicycle or scooter or other two-wheel vehicle.

As shown in FIG. 1D, the charging system 100 may be above a ground surface. For example, the rollers 103, 105 and/or motor 113 may be above a ground surface. In some embodiments, the charging system 100, or portions thereof, may be below a ground surface. For example, the rollers 103, 105 may be below a ground surface or at the same height as a ground surface such that a ramp may not be needed for a vehicle to access the charging system 100 to have its wheel(s) rotated by the roller(s) 103, 105.

Figure 1E:
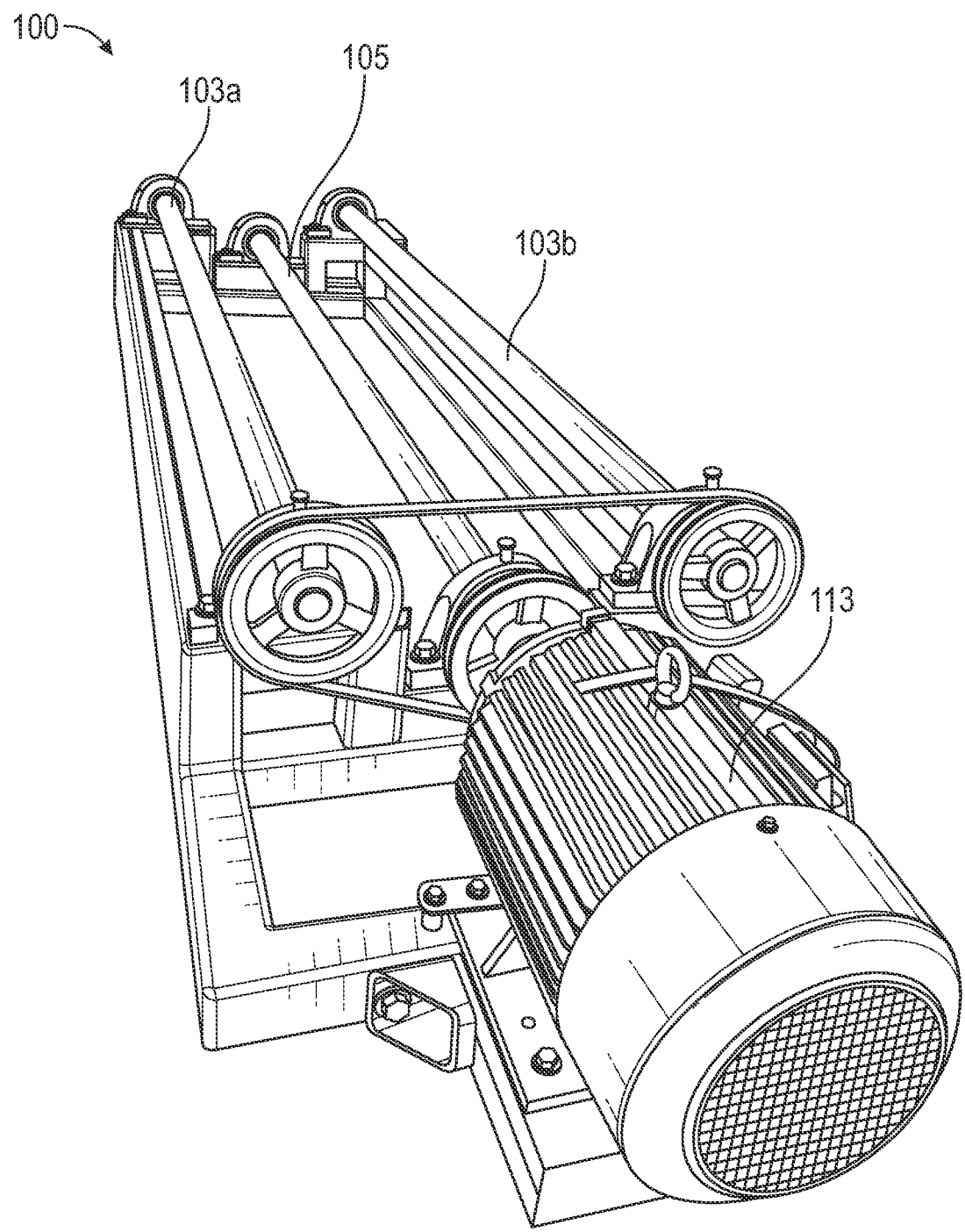

FIG. 1E illustrates an example embodiment of an electric vehicle charging system 100 (e.g., charging system 100). The example embodiment shown in FIG. 1E may include similar components and structural and functional features as described with reference to the other Figures, such as FIG. 1A. As shown in the example embodiment of FIG. 1E, the charging system 100 may include spindle rollers 103a/b, a drive roller 105 and a motor 113 such as may be described elsewhere herein.

In some embodiments, the rollers 103, 105 may be parallel to one another and may each be configured at varying distances from a ground surface. For example, the drive roller 105 may be positioned at a distance above a ground surface that is less than a distance above the ground surface at which one or more of the spindle rollers 103a/b are positioned. The spindle rollers 103a/b may be positioned at distances from a ground surface that are the same as each other or different than each other.

Figure 1F:
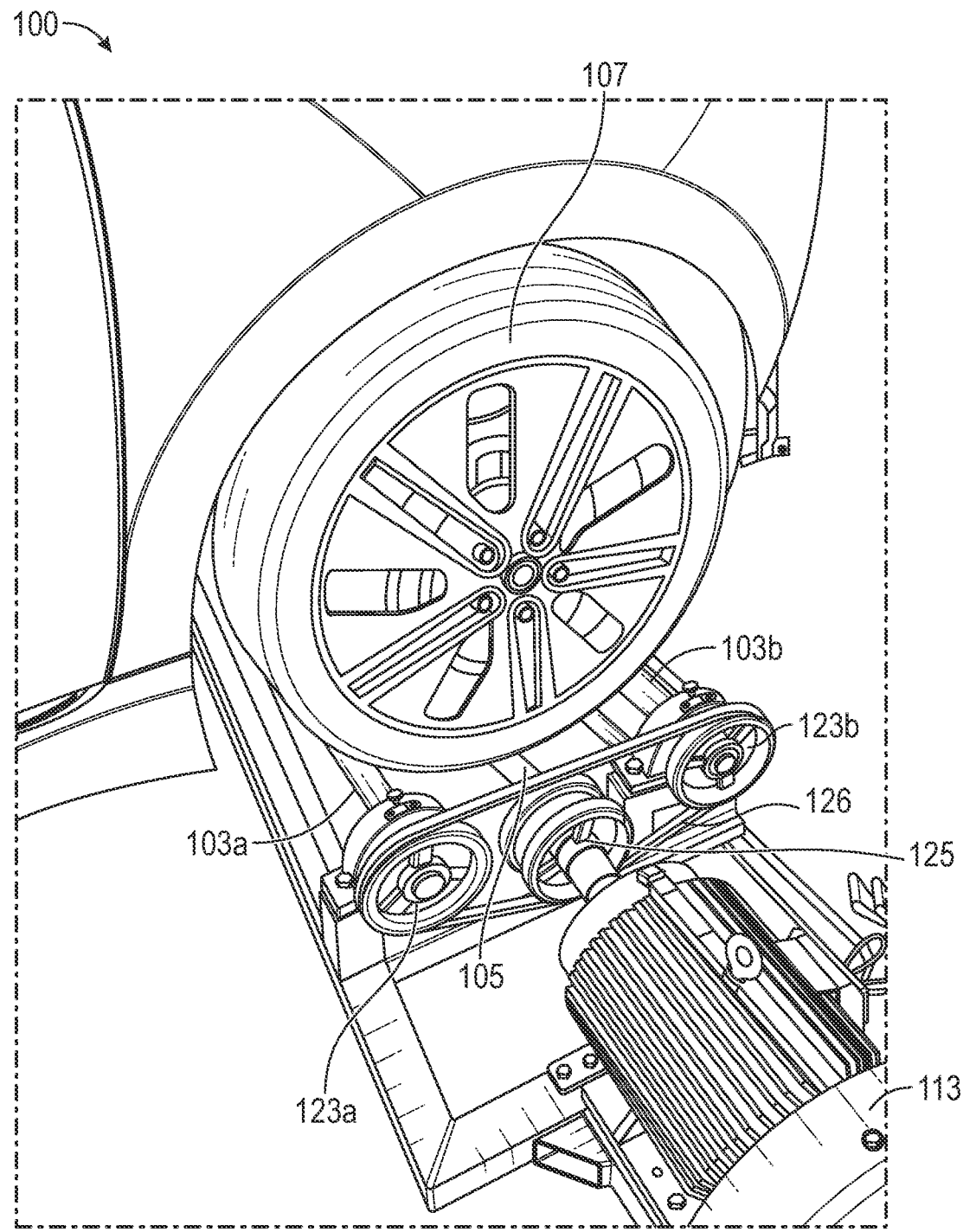

As shown in the example embodiment of FIG. 1E, the rollers may be positioned to hold the wheel(s) of a vehicle (see also FIG. 1F). The rollers may be positioned as required or desired, for example to hold wheels of various sizes. In some embodiments, the rollers 103, 105 may be adjusted (e.g., manually and/or automatically) to accommodate and hold wheels of various sizes. Positioning the rollers 103, 105 such that they hold or cradle a vehicle wheel (such as shown in FIG. 1E) may allow the rollers to rotate the vehicle wheel while simultaneously holding the vehicle wheel in the same place. In some embodiments, the rollers 103, 105 may be positioned such that they contact the wheel at points around the wheel circumference that would be farther apart than what is shown in FIG. 1E. This may allow for a more aggressive hold on the wheel which may facilitate holding the wheel in the same place which may be advantageous when rotating the wheel, especially at larger angular velocities and/or larger angular accelerations. Likewise, more rollers, such as spindle rollers, may be implemented to more securely hold the vehicle wheel in place while it is rotating.

In some embodiments, each of the rollers 103, 105 may be positioned at a same or similar distance from a ground surface as each of the other rollers 103, 105. For example, the rollers 103, 105 may form a plane surface on which the wheel is positioned and rotated. In some embodiments, the rollers may be integrated as part of a conveyer-belt-like surface on which the vehicle wheel is rotated.

FIG. 1F illustrates an example embodiment of an electric vehicle charging system 100 (e.g., charging system 100). The example embodiment shown in FIG. 1F may include similar components and structural and functional features as described with reference to the other Figures, such as FIG. 1A. As shown in the example embodiment of FIG. 1F, the charging system 100 may include spindle rollers 103a/b, a drive roller 105 and a motor 113 such as may be described elsewhere herein. The charging system 100 may also include spindle roller pulleys 123a/b, a drive roller pulley 125 and a belt 126. The pulleys 123, 125 may comprise gears which may have teeth, or other similar rotatable components. The belt 126 may comprise a chain. The pulleys 123, 125 may comprise various sizes as required or desired and may all be the same size or may be different sizes than each other.

A shaft of the motor 113 may be rotatably coupled to the drive roller 105 and/or to the drive roller pulley 125. The motor 113 may directly cause the drive roller 105 and/or the drive roller pulley 125 to rotate. For example, the motor 113 may operate to cause the shaft of the motor to rotate which may in turn cause the drive roller 105 and/or the drive roller pulley 125 to rotate.

The belt 126 may be rotatably coupled to the pulleys 123, 125. In some embodiments, rotation of the drive roller pulley 125 may cause the spindle roller pulleys 123a/b to rotate, for example, via the belt 126. In some embodiments, rotation of the drive roller pulley 125 may not cause the spindle roller pulleys 123a/b to rotate.

The pulleys 123, 125 may be rotatably coupled to the rollers 103, 105. For example, the drive roller 105 and drive roller pulley 125 may both rotate about a same axis of rotation and may be directly rotatably coupled. Each of the spindle rollers 103a/b and respective spindle roller pulleys 123a/b may rotate about a same axis of rotation and may be directly rotatably coupled. Rotation of the rollers 103, 105 may cause the wheel 107 to rotate which may cause an energy to be stored in an energy storage device of the vehicle. The motor 113 may cause the pulleys 123, 125 (and rollers 103, 105) to rotate at a high angular velocity or at a low angular velocity as required or desired. The pulleys 123, 125 (and rollers 103, 105) may rotate at a higher or lower angular velocity than the wheel 107.

Figure 1G:
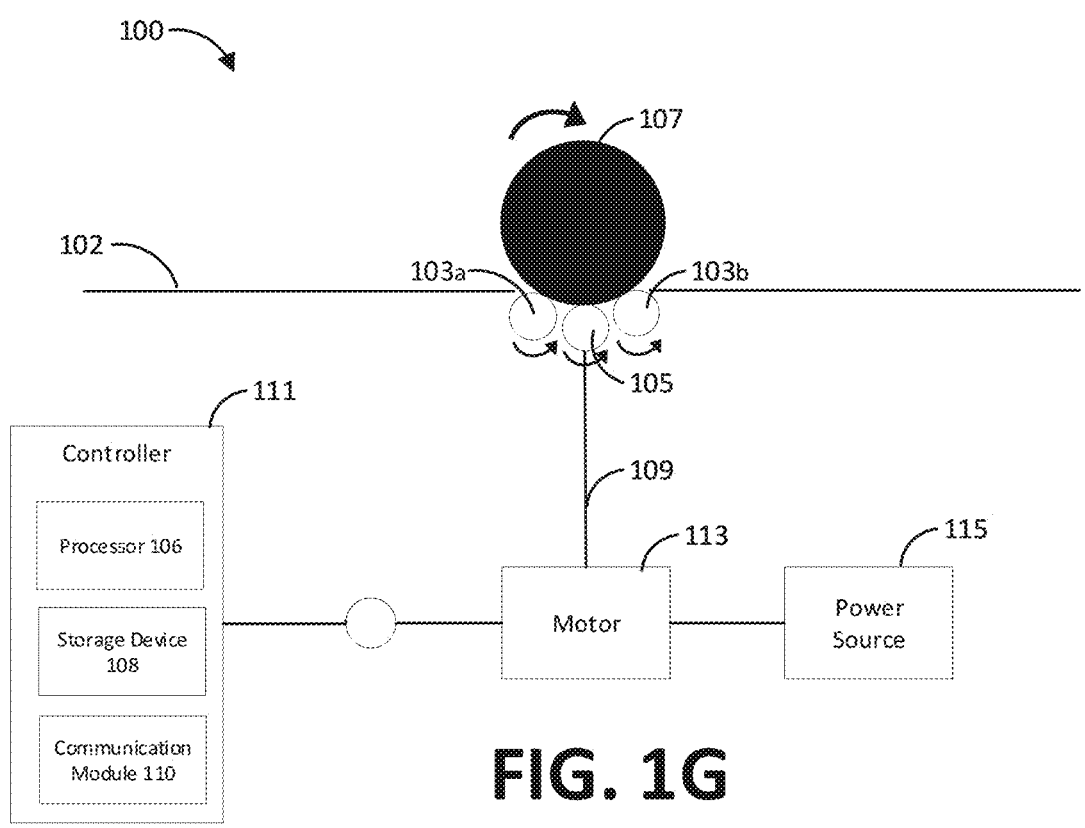
FIG. 1G is a schematic diagram illustrating a side view of an example embodiment of an electric vehicle charging system.

FIG. 1G is a schematic diagram illustrating an example embodiment of an electric vehicle charging system 100 (e.g., charging system 100). As shown, the rollers 103, 105 of the charging system 100 can be positioned at a substantially similar height as a ground surface 102 or beneath a height of a ground surface 102. As shown, when the rollers 103, 105 are at a same height as a ground surface 102 or beneath a height of a ground surface, a vehicle may access the charging system 100 by driving directly onto the rollers 103, 105 such that the wheel 107 remains at a substantially constant height when being rotated by the rollers 103, 105 as when on a ground surface 102. In embodiments where the rollers 103, 105 are at a same height as a ground surface 102 or beneath a ground surface 102, other devices and components of the charging system 100, such as the controller 111, the motor 113, the power source 115, may be beneath a ground surface or above a ground surface as required or desired.

Example Methods for Charging an Electric Vehicle

Figure 2A:
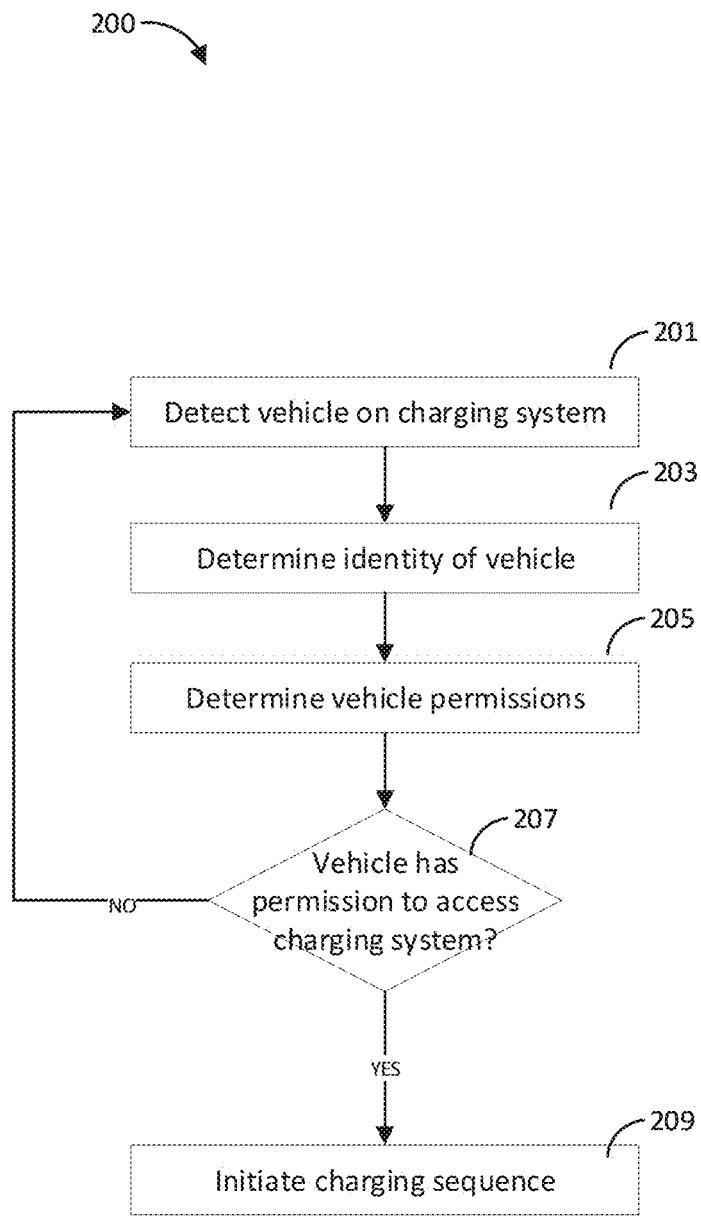
FIG. 2A is a flowchart illustrating an example process for validating a vehicle's identity prior to initiating a charging sequence.

FIG. 2A is a flowchart illustrating an example process 200 for validating a vehicle's identity prior to initiating a charging sequence. Example process 200, or any portion thereof, may be implemented on, or executed, by a computing device, such as a processor and in some embodiments may be implemented on a processor of a controller of the charging system described herein such as controller 111.

At block 201, the processor can detect the presence of a vehicle on the charging system. The processor may detect the presence of the vehicle in response to a signal from a sensor such as a motion sensor, a weight sensor, a magnetic field detector sensor or the like. At block 203, the processor may determine an identify of the detected vehicle. In some embodiments, the processor may determine the vehicle's identity by establishing a communication (e.g., wirelessly) with the vehicle and receiving data from the vehicle relating to the vehicle's identity. In some embodiments, the processor may determine the vehicle's identity by receiving user input at the controller relating the vehicle's identity. In some embodiments, the processor may determine the vehicle's identity by receiving data from one or more sensors (such as a camera) that may gather information (e.g., images) of the vehicle and transmit them to the processor. The identity of the vehicle may include a make of the vehicle, a model of the vehicle, a year of the vehicle, a vehicle identification number, a license plate number, an owner of the vehicle, a status of the vehicle (such as whether the vehicle has been registered to access and use the charging system) or other such information. By identifying and determining a vehicle's identity, the charging system may be able to more easily control access to the charging system such as by allowing certain people or vehicles to use the charging system and preventing others from using the charging system.

At block 205, the processor may determine the permissions associated with the vehicle. For example, the processor may maintain (e.g., in memory), or may have access to, a list of vehicles as well as permissions that have been granted to the vehicles. For example, the processor may maintain or have access to a list of vehicles registered to access and use the charging system. Each of these vehicle's may have a permission status indicating their allowed use of the charging system. A vehicle may be registered with the charging system such that the processor may include the vehicle's identifying information and update the vehicle's permission status to grant the vehicle permission to use the charging system. In some embodiments, a list of vehicles registered or otherwise associated with the charging system may have tiered levels of permissions. For example, a group of vehicles may have a first permission level granting them unlimited access to the charging system and another group of vehicles may have a second permission level granting them limited access to the charging system, such as a limited number of charges or a limited number of charges per time frame. For example, some vehicles may only have permission to charge three times after which they will not be able to access the charging system to be charged, for example until they renew their registration, or some vehicles may have permission to charge their vehicle once per week.

At block 207, the processor may determine whether the vehicle has permission to access the charging system to be charged. The determination may be based on the vehicle's identity and associated permission as discussed above. For example, the processor may validate the permissions associated with the vehicle and/or may verify the permissions against some other criteria such as a history of charges, the time of the last charge, a payment history etc.

If, at block 207 the processor determines that the vehicle has permission to access and use the charging system, the processor may initiate a charging sequence at block 209 to charge the vehicle. Otherwise, the processor may return to block 201 without initiating a charging sequence. In some embodiments, the processor may output a message indicating a failure to charge and a reason for not charging in cases where the processor does not initiate a charge sequence.

Process 200 is provided as an example and is not intended to be limiting. In some embodiments, the processor may not implement all the blocks shown in process 200 or may implement additional blocks to those that are shown in process 200. In some embodiments, the processor may execute the blocks in an order that is different than shown in process 200. In some embodiments, the controller may initiate a charging sequence automatically, for example upon detecting the presence of a vehicle on the charging system, without validating the identify and permissions of the vehicle. In some embodiments, the controller may only initiate a charging sequence in response to a user input to initiate the charging sequence without detecting the presence of a vehicle and without validating the vehicle's identity and permissions.

Figure 2B:
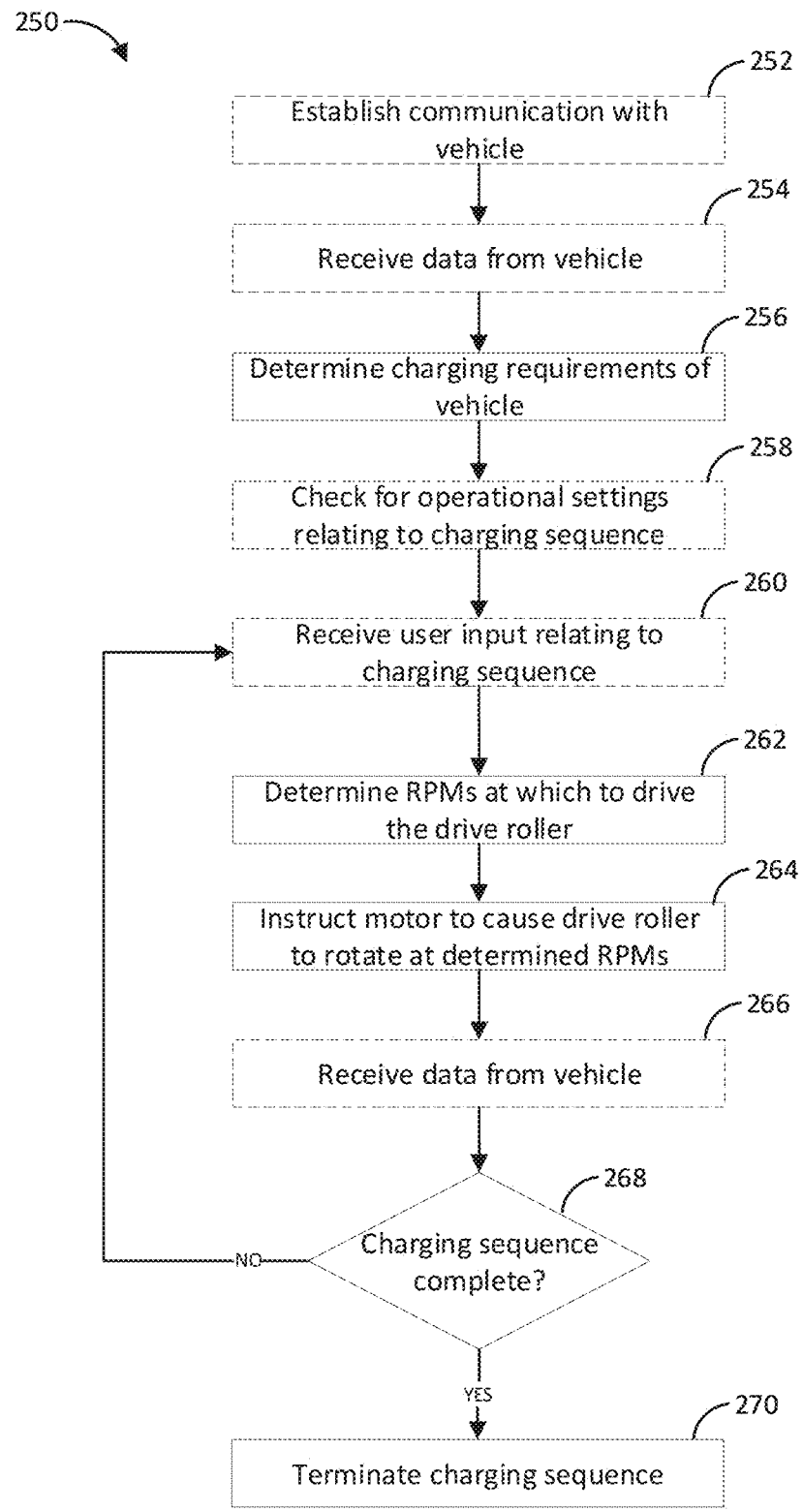
FIG. 2B is a flowchart illustrating an example process for charging a vehicle.

FIG. 2B is a flowchart illustrating an example process 250 for charging a vehicle. Example process 250, or any portion thereof, may be implemented on, or executed, by a computing device, such as a processor and in some embodiments may be implemented on a processor of a controller of the charging system described herein such as controller 111.

At block 252, the processor may optionally establish communication with the vehicle that is to be charged. The communication can be wireless. At block 254, the processor may optionally receive data from the vehicle, such as via a wireless communication. Data received from the vehicle may relate to the charging requirements of the vehicle such as a voltage or charge capacity of an energy storage device of the vehicle, a desired charge rate of an energy storage device, a charge time, a voltage required to charge the energy storage device, a current required to charge or other similar information. Data received from the vehicle may include operational settings relating to a charging sequence, for example an optimal charge sequence for charging the vehicle.

At block 256, the processor may determine the charging requirements of the vehicle. The processor may determine the charging requirements based on data received from the vehicle such as at step 254 and/or based on data stored in memory of the processor or data to which the processor may have access, such as via a network. The charging requirements may include a voltage, current or amperage required to charge, a charge capacity of the vehicle, a charge time of the vehicle, a charge rate of the vehicle and the like.

At block 258, the processor may optionally check for operational settings relating to a charging sequence for charging the vehicle. For example, the processor may have operational settings stored in memory or may have access to operational settings such as on an external data store or the vehicle. For example, the processor may receive operational settings from the vehicle. Operational settings may define how the charging system operates to charge the vehicle, for example an RPM at which to drive the drive roller(s) or a length of time to drive the drive roller(s). The processor may check for operational settings that correspond to the charging requirements of the vehicle. For example, the processor may have access to various operational settings corresponding to various types of vehicles and/or types of energy storage devices of the vehicle (e.g., make, model, manufacturer etc.), and may check for an operational setting that would correspond to (e.g., satisfy) the charging requirements of the vehicle. If the processor determines an operational setting for charging the vehicle that satisfies the vehicle's charging requirements, the processor may proceed directly to block 262 or may proceed to block 260. If the processor determines no operational settings are available that correspond to the vehicle's charging requirements, the processor may proceed to block 260.

At block 260, the processor may optionally receive user input relating to a charging sequence, for example, via the controller. For example, a user may input information relating to the charging sequence such as the RPMs at which to drive the drive roller(s), a time for which to drive the drive roller(s), a time or command to start the charge sequence, a time or command to stop the charge sequence etc.

In some embodiments, the user input received at block 260 may override an operational setting retrieved by the processor at block 258. In some embodiments, an operational setting retrieved by the processor at block 258 may override user input received at block 260. In some embodiments, an operational setting retrieved by the processor at block 258 and a user input received at block 260 may be used simultaneously by the processor.

At block 262, the processor may determine an RPM at which to drive the drive roller(s). The processor may determine the RPM based on a user input at block 260 and/or an operational setting retrieved at block 258. At block 264, the processor may instruct the motor(s) of the charging system to cause the driver roller(s) to rotate at the determined RPM.

At block 266, the processor may optionally receive data from the vehicle. This data may correspond to information relating to a charge status of the vehicle, such as a voltage or charge level or charge rate of an energy storage device of the vehicle. This data may indicate to the processor a length of remaining time until the vehicle is fully charged, an amount of remaining voltage or charge until the vehicle is fully charged or the like.

At block 268, the processor may determine whether the charge sequence has been completed. This determination may be based on data received from the vehicle at block 266 and/or input received from a user at a block 260. The processor may consider the charge sequence to be completed when an energy storage device of the vehicle has been fully charged, when a certain time has elapsed when an energy storage device of the vehicle has been charged by a certain amount, or when a user has inputted a command to terminate the charge sequence etc.

If the processor determines at block 268 that the charge sequence is complete, the processor may terminate the charge sequence at block 270. Termination of the charge sequence can include instructing the motor(s) to cause the drive roller(s) to stop rotating.

If the processor determines at block 268 that the charge sequence is complete, the processor may check for user input relating to the charge sequence. For example, the processor may check to see whether a user has input a command to terminate the charge sequence (e.g., prior to the vehicle being fully charged). For example, a user may optionally choose to terminate a charge sequence at any time during charging by inputting user input for example via the controller.

Process 250 is provided as an example and is not intended to be limiting. In some embodiments, the processor may not implement all the blocks shown in process 250 or may implement additional blocks to those that are shown in process 250. In some embodiments, the processor may execute the blocks in an order that is different than shown in process 250.

Figure 3A:
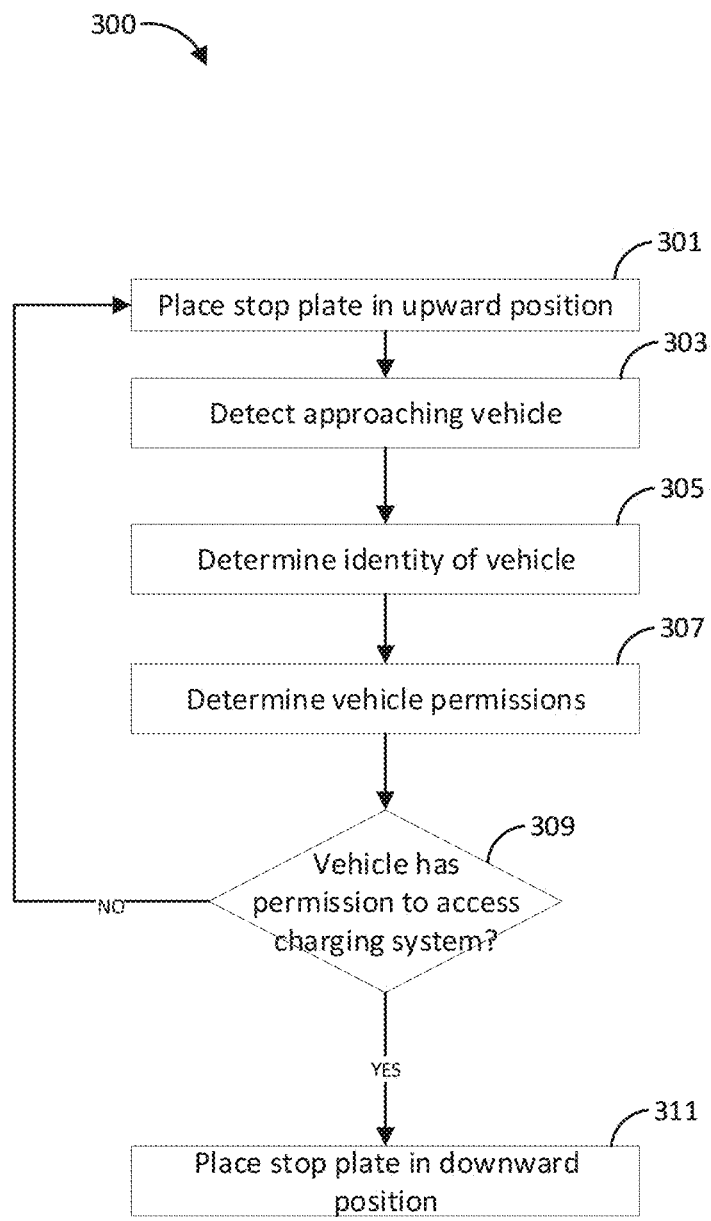
FIG. 3A is a flowchart illustrating an example process for validating a vehicle's identity to control operation of a stop plate of a charging system.

FIG. 3A is a flowchart illustrating an example process 300 for validating a vehicle's identity to control operation of a stop plate of a charging system. The stop plate described in process 300 may include structural and/or operational features similar to stop plate 117 described with reference to FIG. 1A. Example process 300, or any portion thereof, may be implemented on, or executed, by a computing device, such as a processor and in some embodiments may be implemented on a processor of a controller of the charging system described herein such as controller 111.

At block 301, the processor may cause a stop plate to be placed in an upward position, for example by sending instructions to an actuator of the stop plate. When in the upward position, the stop plate may prevent vehicles from accessing the charging system to be charged, for example by preventing vehicles from driving up a ramp.

At block 303, the processor may detect a vehicle that is approaching or near the charging system. The processor may detect the presence of a vehicle using one or more sensors as described elsewhere herein and/or may detect a vehicle based on user input, for example at the controller, that a vehicle is near or approaching the charging system to be charged.

At block 305, the processor may determine the identity of the vehicle and at block 307 may determine the permissions associated with the identified vehicle. At block 309, the processor may determine whether the vehicle has permission to access the charging system for example to be charged. The bocks 305, 307 and 309 may include, respectively, similar implementations and embodiments as blocks 203, 205 and 207, as described with reference to FIG. 2A.

At block 311, the processor may cause the stop plate to be placed in the downward position for example by sending instructions to an actuator of the stop plate. When in the downward position, the stop plate may allow vehicles to access the charging system to be charged, for example by allowing vehicles to drive up a ramp to position their wheels adjacent to the drive roller(s).

Process 300 is provided as an example and is not intended to be limiting. In some embodiments, the processor may not implement all the blocks shown in process 300 or may implement additional blocks to those that are shown in process 300. In some embodiments, the processor may execute the blocks in an order that is different than shown in process 300.

Figure 3B:
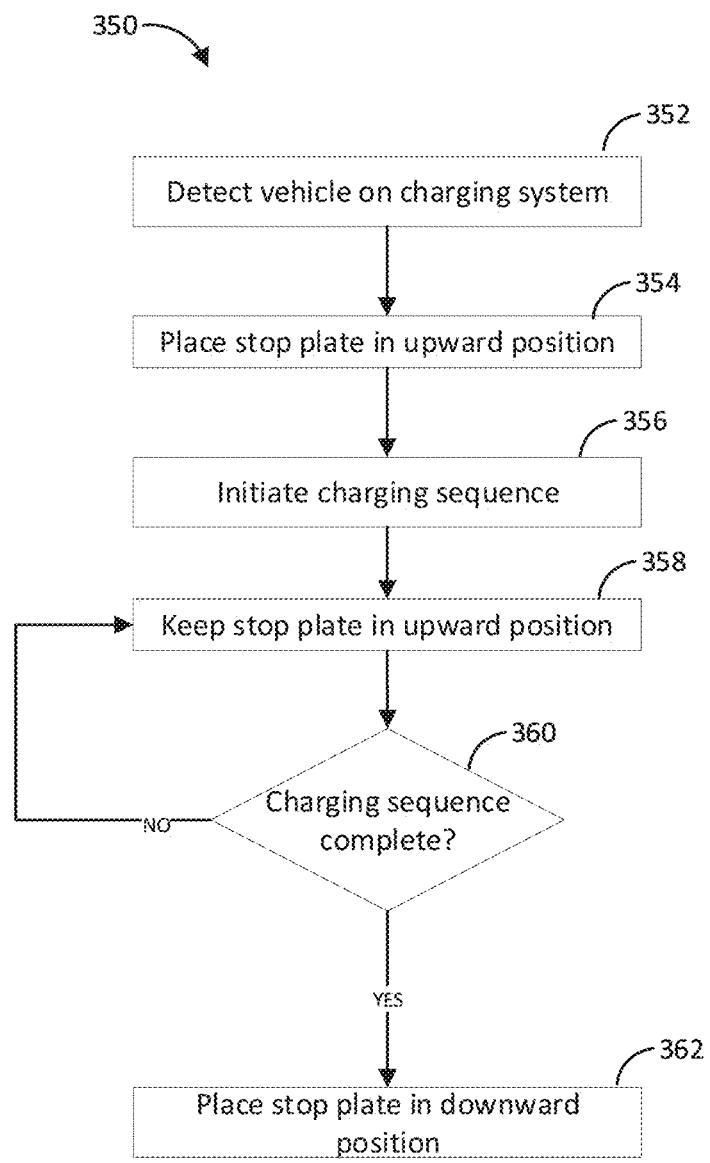
FIG. 3B is a flowchart illustrating an example process for controlling the operation of a stop plate of a charging system.

FIG. 3B is a flowchart illustrating an example process 350 for controlling the operation of a stop plate of a charging system. The stop plate described in process 350 may include structural and/or operational features similar to stop plate 117 described with reference to FIG. 1A. Example process 350, or any portion thereof, may be implemented on, or executed, by a computing device, such as a processor and in some embodiments may be implemented on a processor of a controller of the charging system described herein such as controller 111.

At block 352, the processor may detect the presence of a vehicle on the charging system, for example a vehicle that has accessed the charging system to be charged. The processor may detect the presence of a vehicle using one or more sensors as described elsewhere herein and/or may detect a vehicle based on user input, for example at the controller, that a vehicle is on the charging system, for example to be charged.

At block 354, the processor may cause a stop plate to be placed in an upward position, for example by sending instructions to an actuator of the stop plate. When in the upward position, the stop plate may prevent the vehicle from moving, for example rolling off a ramp of the charging system and/or may maintain the vehicle in a substantially constant position to facilitate a charging of the vehicle by facilitating consistent physical contact between the drive roller(s) and the wheel(s) of the vehicle.

At block 356 the processor may initiate a charging sequence. The charging sequence may include embodiments and implementation described elsewhere herein such as an angular velocity at which to drive the drive roller(s), a time for which to drive the drive roller(s) and the like.

At block 358, the processor may maintain the stop plate in the upward position, for example while the vehicle is being charged during the charge sequence. At block 360, the processor may determine whether the charging sequence is complete. Block 360 may include similar embodiments and implementations described with reference to block 268 of FIG. 2B. For example, the processor may determine whether a charge sequence is complete based on data received from the vehicle and/or user input, for example at the controller.

If the charging sequence is not complete, the processor may return to block 358 to keep the stop plate in the upward position. If the charging system is complete, the processor may cause the stop plate to be placed in the downward position for example by sending instructions to an actuator of the stop plate. When in the downward position, the stop plate may allow the vehicle on the charging system to leave the charging system, for example by allowing the vehicle to drive off of a ramp of the charging system.

Process 350 is provided as an example and is not intended to be limiting. In some embodiments, the processor may not implement all the blocks shown in process 350 or may implement additional blocks to those that are shown in process 350. In some embodiments, the processor may execute the blocks in an order that is different than shown in process 350.

Additional Embodiments

As used herein, "system," "instrument," "apparatus," and "device" generally encompass both the hardware (for example, mechanical and electronic) and, in some implementations, associated software (for example, specialized computer programs for graphics control) components.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

Each of the processes, methods, and algorithms described in the preceding sections may be embodied in, and fully or partially automated by, code modules executed by one or more computer systems or computer processors including computer hardware. The code modules may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described herein generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various features and processes described herein may be used independently of one another or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The various illustrative logical blocks and modules described in connection with the embodiments disclosed herein can be implemented or performed by a machine, such as a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable devices that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some, or all, of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, and so forth, may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

All of the methods and processes described herein may be embodied in, and partially or fully automated via, software code modules executed by one or more general purpose computers. For example, the methods described herein may be performed by the computing system and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the herein-described embodiments, the elements of which are to be understood as being among other acceptable examples. All such modifications and variations are intended to be included herein within the scope of this disclosure. The section headings used herein are merely provided to enhance readability and are not intended to limit the scope of the embodiments disclosed in a particular section to the features or elements disclosed in that section. The foregoing description details certain embodiments. It will be appreciated, however, that no matter how detailed the foregoing appears in text, the systems and methods can be practiced in many ways. As is also stated herein, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Those of skill in the art would understand that information, messages, and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

What is claimed is:

1. A system for charging a stationary electric vehicle using power generation or regeneration devices of the vehicle, the system comprising:
   one or more drive rollers rotatably coupled to one or more wheels of the vehicle and configured to rotate to thereby cause the wheels of the vehicle to rotate to cause power generation or regeneration devices of the vehicle to generate energy to store in an energy storage device of the vehicle;

a motor rotatably coupled to the drive rollers and configured to cause the drive rollers to rotate;

a plurality of spindle rollers rotatably coupled to the wheels of the vehicle;

a controller configured to:
 communicate with the motor to transmit data to the motor and receive data from the motor;
 generate instructions for a charging sequence of the charging system, wherein the instructions comprise a determined angular velocity at which to rotate the drive rollers; and
 transmit the instructions to the motor of the charging system to cause the motor to rotate the drive rollers at the determined angular velocity;

a power source electrically coupled to the motor and to the controller and configured to provide power to the motor and controller; and a stop plate configured to:
 communicate with the controller to transmit data to the controller and receive data from the controller; and
 transition between an upward position and a downward position in response to instructions received from the controller,
 wherein in the upward position, the stop plate is configured to prevent the vehicle from accessing the charging system to be charged, and
 wherein in the downward position the stop plate is configured to allow the vehicle to access the charging system to be charged.

2. The system of claim 1, wherein the power source is not directly electrically coupled to the vehicle.

3. The system of claim 1, wherein the drive rollers are configured to be located at a substantially ground surface height.

4. The system of claim 1, further comprising a ramp configured to rest on a ground surface, wherein the drive rollers are configured at a top portion of the ramp.

5. The system of claim 1, wherein the controller comprises a handheld device comprising an interactive user interface.

6. The system of claim 1, wherein the controller is configured to:
 receive a user input; and
 generate the instructions for the charging sequence based, at least in part, on the user input.

7. The system of claim 1, wherein the controller is configured to:
 receive operational settings relating to a charging sequence, wherein the operational settings are received from a memory of the controller, an external data store, or the vehicle; and
 generate the instructions for the charging sequence based, at least in part, on the operational settings.

8. The system of claim 1, wherein the controller is configured to communicate with the motor wirelessly.

9. The system of claim 8, wherein the controller is included in the vehicle.

10. The system of claim 1, wherein the controller is configured to communicate with the vehicle to transmit data to the vehicle and receive data from the vehicle.

11. The system of claim 10, wherein the controller is configured to:
 receive data from the vehicle relating to charging requirements of the vehicle; and
 generate the instructions for the charging sequence based, at least in part, on the data received from the vehicle relating to the charging requirements.

12. The system of claim 10, wherein the controller is configured to receive data from the vehicle relating to an identity of the vehicle or permissions of the vehicle to access the charging system to be charged.

13. The system of claim 12, wherein the controller is configured to:
 determine, based on the identity of the vehicle or the permissions of the vehicle, whether the vehicle has permission to access the charging system to be charged; and
 in response to determining that the vehicle has permission to access the charging system, generate the instructions for the charging sequence of the charging system.

14. The system of claim 1, wherein the controller is configured to verify permissions of the vehicle prior to transmitting instructions to the stop plate to transition to the downward position.

15. A method for charging a stationary electric vehicle using power generation or regeneration devices of the vehicle, the method comprising:
 under control of a processor of a controller of a charging system:
  transitioning a stop plate between an upward position and a downward position,
   wherein in the upward position, the stop plate is configured to prevent the vehicle from accessing the charging system to be charged, and
   wherein in the downward position the stop plate is configured to allow the vehicle to access the charging system to be charged;
  generating instructions for a charging sequence, wherein the instructions comprise a determined angular velocity at which to rotate one or more drive rollers of the charging system; and
  transmitting the instructions, from the controller, to a motor of the charging system;
 in response to receiving the instructions at the motor, causing the motor to rotate the drive rollers at the determined angular velocity; and
 by the rotation of the drive rollers at the determined angular velocity, causing one or more wheels of the vehicle to rotate, wherein rotation of said wheels of the vehicle causes power generation or regeneration devices of the vehicle to generate an electric charge to store in an energy storage device of the vehicle.

16. The method of claim 15, further comprising:
 receiving, at the controller, data from the vehicle relating to charging requirements of the vehicle;
 receiving, at the controller, user input; and
 generating the instructions for the charging sequence based at least in part on the user input or the data from the vehicle.

17. The method of claim 15, further comprising:
 verifying, by the controller, permissions of the vehicle to access the charging system to be charged;
 determining, according to the permissions whether the vehicle has permission to access the charging system to be charged;
 in response to determining that the vehicle has permission to access the charging system to be charged:

generating, at the controller, instructions to place the stop plate of the charging system in the downward position;

transmitting, from the controller, said instructions to the stop plate to place the stop plate in the downward position to allow the vehicle to access the charging system; and generating, at the controller, the instructions for the charging sequence; and in response to determining that the vehicle does not have permission to access the charging system to be charged:

generating, at the controller, instructions to place the stop plate of the charging system in the upward position;

transmitting, from the controller, said instructions to the stop plate to place the stop plate in the upward position to prevent the vehicle from accessing the charging system; and not generating, at the controller, the instructions for the charging sequence.

18. A method for charging a stationary electric vehicle using power generation or regeneration devices of the vehicle, the method comprising:

under control of a processor of a controller of a charging system:

transitioning a stop plate to a downward position to allow the vehicle to access the charging system;

establishing communication between the controller and the vehicle;

receiving data from the vehicle comprising charging requirements of the vehicle or operational settings relating to charging the vehicle;

receiving user input relating to charging the vehicle;

determining, based at least in part on the user input or the data from the vehicle, an angular velocity at which to rotate one or more drive rollers of the charging system;

generating instructions for causing a motor to rotate the drive rollers at the determined angular velocity;

transmitting the instructions to the motor to cause the motor to rotate the drive rollers at the determined angular velocity, wherein rotation of the one or more drive rollers causes one or more wheels of the vehicle to rotate, and wherein rotation of the one or more wheels of the vehicle causes the vehicle to generate and store an electric charge;

receiving, at the controller and from the vehicle, data relating to a charge status of the vehicle;

determining, based at least in part on the data relating to the charge status whether the vehicle is fully charged;

in response to determining that the vehicle is fully charged, generating instructions to cause the motor to stop rotating the drive rollers; and transmitting the instructions to the motor to cause the motor to stop rotating the drive rollers.

19. The method of claim 18, further comprising:

determining, an identity of the vehicle and permissions associated with the vehicle;

determining, according to the identity and permissions whether the vehicle has permission to access the charging system to be charged;

in response to determining that the vehicle has permission to access the charging system to be charged:

generating the instructions for causing the motor to rotate the drive rollers at the determined angular velocity; and transmitting the instructions to the motor to cause the motor to rotate the drive rollers at the determined angular velocity; and in response to determining that the vehicle does not have permission to access the charging system to be charged:

not generating the instructions for causing the motor to rotate the drive rollers at the determined angular velocity; and not transmitting the instructions to the motor to cause the motor to rotate the drive rollers at the determined angular velocity.

20. The method of claim 15, further comprising generating the instructions for the charging sequence in response to determining that the vehicle has permission to access the charging system.

* * * * *